(12) United States Patent
Boyanov

(10) Patent No.: US 12,529,677 B2
(45) Date of Patent: Jan. 20, 2026

(54) FAST PULSING FOR NANOPORE SENSORS

(71) Applicant: ILLUMINA, INC., San Diego, CA (US)

(72) Inventor: Boyan Boyanov, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 126 days.

(21) Appl. No.: 18/471,484

(22) Filed: Sep. 21, 2023

(65) Prior Publication Data

US 2024/0110889 A1     Apr. 4, 2024

Related U.S. Application Data

(60) Provisional application No. 63/377,481, filed on Sep. 28, 2022.

(51) Int. Cl.
*G01N 27/327* (2006.01)
*C12Q 1/6869* (2018.01)
*G01N 27/447* (2006.01)

(52) U.S. Cl.
CPC ..... *G01N 27/44713* (2013.01); *C12Q 1/6869* (2013.01); *G01N 27/44791* (2013.01)

(58) Field of Classification Search
CPC ....... G01N 27/44713; G01N 27/44791; G01N 33/48721; C12Q 1/6869
See application file for complete search history.

(56) References Cited

U.S. PATENT DOCUMENTS

| | | | |
|---|---|---|---|
| 5,432,272 A | 7/1995 | Benner | |
| 6,150,510 A | 11/2000 | Seela et al. | |
| 2013/0341192 A1 | 12/2013 | Dunbar et al. | |
| 2021/0018486 A1 | 1/2021 | Bajaj | |

FOREIGN PATENT DOCUMENTS

| | | | | |
|---|---|---|---|---|
| KR | 20200144711 A | * | 12/2020 | ............... B01J 19/08 |
| WO | WO 92/02258 | | 6/1993 | |
| WO | WO 93/10820 | | 10/1994 | |

(Continued)

OTHER PUBLICATIONS

EPO machine-generated English language translation of Yang et al. KR 20200144711A, patent published Dec. 30, 2020 (Year: 2020).*

(Continued)

*Primary Examiner* — Alexander S Noguerola
(74) *Attorney, Agent, or Firm* — Knobbe, Martens, Olson & Bear, LLP

(57) ABSTRACT

Sequencing systems and methods are provided that include a nanopore sensor that includes a cis well associated with a cis electrode and a trans well associated with a trans electrode, a membrane separating the cis well and the trans well, and a nanopore well embedded in the membrane providing a channel through the membrane; a command node connected directly to the nanopore sensor. The command node is configured to apply a potential across the nanopore well and a command pulse. The system further includes an amplifier with a feedback loop coupled to the nanopore sensor and a switch disposed between the amplifier and the nanopore sensor. The switch is driven by a clock pulse and configured to ground an inverting input of the amplifier.

34 Claims, 11 Drawing Sheets

(56) References Cited

FOREIGN PATENT DOCUMENTS

WO     WO 94/22892     10/1994
WO     WO 94/24144     10/1998

OTHER PUBLICATIONS

Singer, 1989, UV spectral characteristics and acidic dissociation constants of 280 alkyl bases, nucleosides, and nucleotides, in Fasman ed., Practical Handbook of Biochemistry and Molecular Biology, CRC Press, Boca Raton, FL, pp. 385-394.
Goldstein et al., Apr. 2012, CMOS low current measurement system for biomedical applications, IEEE Transactions on Biomedical Circuits and Systems, 6(2):111-119.
Kim et al., 2013, Detecting single-abasic residues within a DNA strand immobilized in a biological nanopore using an integrated CMOS sensor, Sensors and Actuators B: Chemical, 177:1075-1082.
Kim et al., Jun. 2013, A patch-clamp ASIC for nanopore-based DNA analysis, IEEE Transactions on Biomedical Circuits and Systems, 7(3):285-295.
Lu et al., Jun. 1, 2021, A review of CMOS electrochemical readout interface designs for biomedical assays, IEEE Sensors Journal, 21(11):12469-12483.
International Search Report and Written Opinion dated Feb. 7, 2024, in application No. PCT/US/2023/033345.

\* cited by examiner

FAST PULSING FOR NANOPORE SENSORS

CROSS-REFERENCE TO RELATED APPLICATIONS

This application claims priority to U.S. Provisional Application No. 63/377,481, filed on Sep. 28, 2022, the content of which is incorporated by reference in its entirety.

BACKGROUND

Field

The present technology generally relates to system and methods for fast pulsing of nanopore sensors and, more specifically, to systems and methods for fast pulsing of nanopore sensors with robust sub-μs pulses while maintaining pulse integrity.

Description of the Related Art

Nanopore sensors are being developed for several applications in the fields of genomics, transcriptomics, and proteomics (to name a few), such as for sequencing DNA, RNA, and proteins rapidly. The ability of nanopore sensors to resolve single analyte molecules, resolve structural modifications of molecules, and distinguish between nucleotide sequences makes these sensors highly desirable. When a nanopore well is used for polynucleotide sequencing, it can provide a channel for an ionic electrical current through the nanopore well. As a polynucleotide or label/tab of an incorporated nucleotide is translocated through or associated with the nanopore well, it changes the resistivity of the nanopore well. Each nucleotide (or a series of nucleotides) or label/tab yields a characteristic electrical signal, and the record of the signal levels may be used to determine the sequence of the translocating polynucleotide or translocating label/tab.

Certain nanopore sensors and methods require the application of a controlling signal, such as a clock pulse signal to translocate a polynucleotide or a polypeptide relative to the nanopore well in a stepwise manner. The duration of each pulse of the clock pulse signal is required to be within microseconds or hundreds of nanoseconds to ensure that each pulse translocates the polynucleotide, polypeptide, or label/tab relative to the nanopore well exactly one unit at a time. However, employing such short time duration pulses in a typical nanopore sensor that implements a trans-impedance amplifier is challenging due to a limited time response of the amplifier. For example, the amplifier has a limited time response because at the high gain required for nanopore well sequencing (typically $10^9$ V/A or higher) the bandwidth is limited and any fast pulse applied to the input is distorted due to the slow settling time at the required gain, typically on the order of 100 s of us to a few ms. Thus, there is a need for a system and a method that provides the clock pulse signal with short time duration pulses to translocate a polynucleotide, polypeptide, or label/tab relative to a nanopore well.

SUMMARY

The following are examples of certain devices for sequencing biopolymers (e.g., polynucleotides or proteins) rapidly and with low signal noise and methods of operation of the devices.

Provided herein is a sequencing system comprising a nanopore sensor including a cis well associated with a cis electrode and a trans well associated with a trans electrode, a membrane separating the cis well and the trans well, and a nanopore well embedded in the membrane providing a channel through the membrane; a command node connected directly to the nanopore sensor, wherein the command node is configured to apply a potential across the nanopore sensor and a command pulse; an amplifier with a feedback loop coupled to the nanopore sensor; and a switch disposed between the amplifier and the nanopore sensor, wherein the switch is driven by a clock pulse and configured to ground an inverting input of the amplifier.

In some embodiments, the switch is configured to close when a threshold of the clock pulse is exceeded. In some embodiments, the switch is configured to open when the amplitude of the clock pulse drops below the threshold. In some embodiments, the clock pulse is the same as the command pulse. In some embodiments, the clock pulse is applied at a predetermined time prior to the command pulse being applied. In some embodiments, the clock pulse has a trailing edge that trails a trailing edge of the command pulse by a second predetermined time. In some embodiments, the nanopore sensor is about 5 μm wide. In some embodiments, the width of the nanopore sensor is in the range of μm, such as from 1 μm to about 200 μm. In some embodiments, the width of the nanopore sensor is wider than 200 μm. In some embodiments, the membrane is a solid-state membrane, a polymeric membrane, or a lipid membrane.

In some embodiments, a method of using the sequencing system is provided, the method including applying a potential across a nanopore well of a nanopore sensor via a command node connected directly to the nanopore sensor, wherein the nanopore well is configured to receive a polynucleotide; generating a command pulse to translocate one unit of the polynucleotide through the nanopore well; and applying a clock pulse to close a switch disposed between the nanopore sensor and an amplifier to ground an inverting input of the amplifier during the translocation of the polynucleotide.

In some embodiments of the method, the clock pulse is the same as the command pulse. In some embodiments of the method, the clock pulse is applied before the command pulse. In some embodiments of the method, the switch is closed about 100 μs before the application of the command pulse. In some embodiments of the method, the clock pulse has a trailing edge that trails the trailing edge of the command pulse. In some embodiments of the method, the switch is opened about 100 μs after the end of the trailing edge of the command pulse. In some embodiments of the method, the nanopore sensor is about 5 μm wide. In some embodiments of the method, the command pulse has a duration of from about 0.1 μs to about 50 μs. In some embodiments of the method, the command pulse duration is from about 0.5 μs to about 50 μs. In some embodiments, the command pulse has a duration of from about 0.1 μs to about 1,000 μs, such as 0.5 μs to about 500 μs.

Also provided herein is a sequencing system, including a nanopore sensor that includes a cis well associated with a cis electrode and a trans well associated with a trans electrode, a membrane separating the cis well and the trans well, and a nanopore well embedded in the membrane providing a channel through the membrane; a command node connected directly to the nanopore sensor, wherein the command node is configured to apply a potential across the nanopore sensor and a command pulse; an amplifier with a feedback loop coupled to the nanopore sensor; a switch disposed across the feedback loop, wherein the switch is driven by a clock pulse and configured to bypass an inverting loop when the switch is closed.

In some embodiments, the switch is configured to close when a threshold of the clock pulse is exceeded. In some embodiments, the switch is configured to open when the amplitude of the clock pulse drops below the threshold. In some embodiments, the clock pulse is the same as the command pulse. In some embodiments, the clock pulse is applied at a predetermined time prior to the command pulse being applied. In some embodiments, the clock pulse has a trailing edge that trails a trailing edge of the command pulse by a second predetermined time. In some embodiments, wherein the nanopore sensor is about 5 μm wide. In some embodiments, the membrane is a solid-state membrane, a polymeric membrane, or a lipid membrane.

A better understanding of the nature and advantages of the various embodiments of the present invention may be gained with reference to the following detailed description and the accompanying drawings.

BRIEF DESCRIPTION OF THE DRAWINGS

Features of examples of the present disclosure will become apparent by reference to the following detailed description and drawings, which like reference numerals, correspond to similar, though perhaps not identical, components. For the sake of brevity, reference numerals or features having a previously described function may or may not be described in connection with other drawings in which they appear.

DETAILED DESCRIPTION

All patents, applications, published applications and other publications referred to herein are incorporated herein by reference to the referenced material and in their entireties. If a term or phrase is used herein in a way that is contrary to or otherwise inconsistent with a definition set forth in the patents, applications, published applications and other publications that are herein incorporated by reference, the use herein prevails over the definition that is incorporated herein by reference.

Figure 1A:
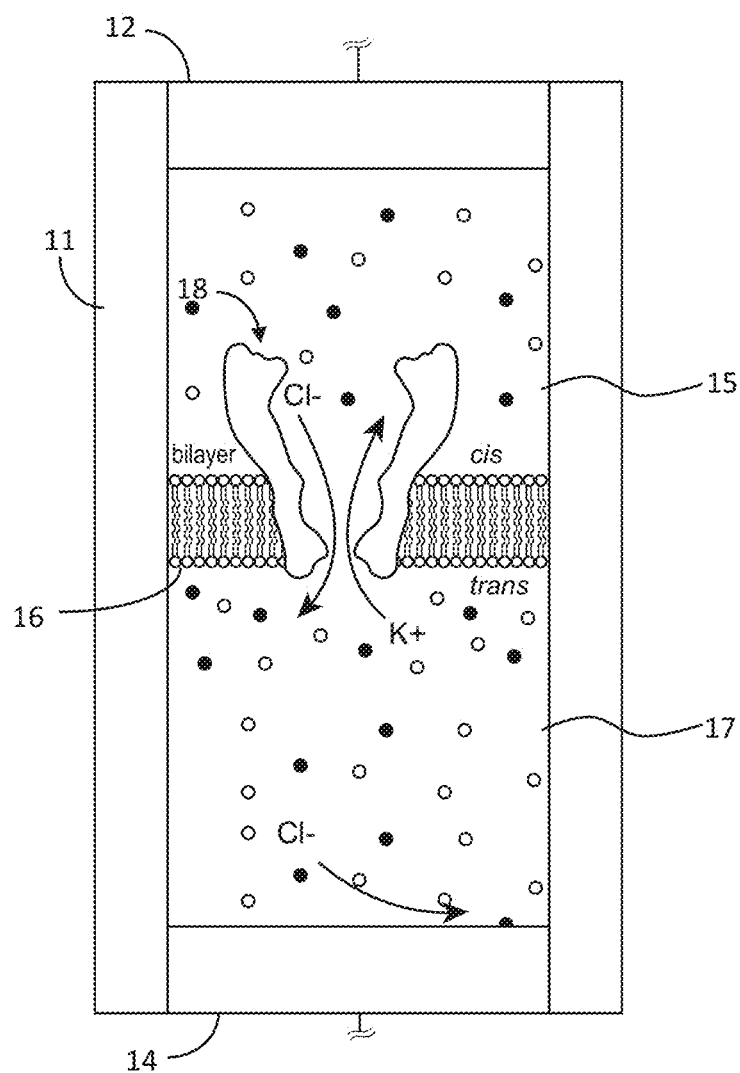
FIG. 1A is a schematical view of an exemplary nanopore sensor.
Figure 1B:
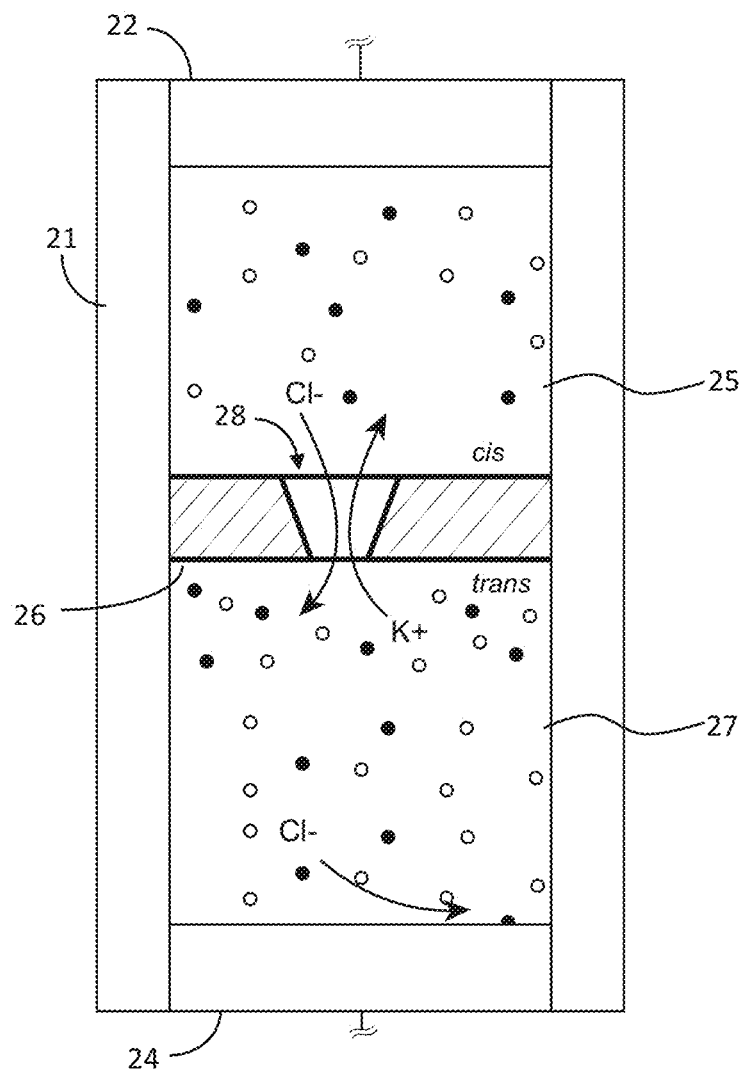
FIG. 1B is a schematical view of another exemplary nanopore sensor.

The technique of nanopore well sequencing is based on measuring electrical currents that flow through the nanopore well. For example, the flow of the electrical currents is changed based on a nucleotide base passing through or interacting with the nanopore well. Each nucleotide base that passes through or enters the nanopore well can cause a variation of the electrical currents, so measuring the electrical currents (or detecting the electrical current flow variation) can provide a means to detect the type of nucleotide base interacting with the nanopore well. As shown in FIGS. 1A and 1B, nanopore sensor devices 10, 20 include a cis well 15, 25, a cis electrode 12, 22, a trans well 17, 27, and a trans electrode 14, 24. Each trans well 17, 27 is separated from the cis well 15, 25 by a lipid/polymer/solid-state membrane 16, 26 having a nanopore well 18, 28. As such, each trans well 17, 27 is also associated with a respective nanopore well 18, 28. A biological nanopore well 18 inserted in a membrane 16 is shown in FIG. 1A. A solid-state nanopore well 28 formed in a solid-state membrane 26 is shown in FIG. 1B. In other embodiments, the nanopore sensor devices comprise a hybrid-nanopore well in which a biological nanopore well is inserted in a solid-state membrane Ionic current between the cis electrode and trans electrode is established by redox species by faradaic or by non-faradaic processes. The nanopore sensor devices 10, 20 are formed in an array. In certain embodiments, the nanopore sensors devices 10, 20 in an array of 10,000 or more, 100,000 or more, or 1,000,000 or more nanopore sensor devices. In certain embodiments, one or more nanopore sensor devices 10, 20 can be integrated as an application-specific integrated circuit (ASIC). In certain embodiments, the nanopore sensor devices 10, 20 may share one or more common cis electrodes and/or may share one or more common trans electrodes.

In certain examples, the electrodes are active (i.e., the electrodes actively participate in the redox reaction), and the reactive electrolyte species (i.e., redox anions) are consumed by being plated out at the trans electrode in a positive polarity to support Faradaic current through the system. In certain examples, the electrodes are passive (i.e., the electrodes do not actively participate in the redox reaction), and the reactive electrolyte species (i.e., redox couple ions) are consumed by being oxidized at the trans electrode in a positive polarity to support Faradaic current through the system. In these examples, the redox couple is suspended in a redox-inactive electrolyte buffer.

Definitions

It is to be understood that terms used herein will take on their ordinary meaning in the relevant art unless specified otherwise. Several terms used herein and their meanings are set forth below.

The singular forms "a", "an", and "the" include plural referents unless the context clearly dictates otherwise.

The terms comprising, including, containing and various forms of these terms are synonymous with each other and are meant to be equally broad.

The terms top, bottom, lower, upper, on, etc., are used herein to describe the nanopore sensor device and/or the various components of the nanopore sensor device. It is to be understood that these directional terms are not meant to imply a specific orientation but are used to designate relative orientation between components. The use of directional terms should not be interpreted to limit the examples disclosed herein to any specific orientation(s).

The terms first, second, etc. also are not meant to imply a specific orientation or order, but rather are used to distinguish one component from another.

It is to be understood that the ranges provided herein include the stated range and any value or sub-range within the stated range, as if such values or sub-ranges were explicitly recited. For example, a range from about 50 microseconds to about 500 microseconds should be interpreted to include not only the explicitly recited limits of from about 50 microseconds to about 500 microseconds but also to include individual values, such as about 100 microseconds, about 335 microseconds, about 400.5 microseconds, about 490 microseconds, etc., and sub-ranges, such as from about 75 microseconds to about 475 microseconds, from about 200 microseconds to about 300 microseconds, etc. Furthermore, when "about" and/or "substantially" are/is utilized to describe a value, this is meant to encompass minor variations (up to +/−10%) from the stated value.

As used herein, the terms "fluidically connecting," "fluid communication," "fluidically coupled," and the like refer to two spatial regions being connected together such that a liquid or gas may flow between the two spatial regions. For example, a cis well may be fluidically connected to a trans well or a plurality of trans wells, such that at least a portion of an electrolyte solution may transit between the connected wells. The two spatial regions may be in fluid communication through a nanopore well or through one or more valves, restrictors, or other fluidic components that are to control or regulate transit of ions through a system.

As used herein, the term "membrane" refers to a non-permeable or semi-permeable barrier or other sheets that separates two liquid/gel chambers (e.g., a cis well and a trans well) which can contain the same compositions or different compositions therein. The permeability of the membrane to any given species depends upon the nature of the membrane. In some examples, the membrane may be non-permeable to ions, to electric current, and/or to fluids. For example, a lipid membrane may be impermeable to ions (i.e., does not allow any ion transport therethrough), but may be at least partially permeable to water (e.g., water diffusivity ranges from about 40 µm/s to about 100 µm/s). For another example, a synthetic/solid state membrane, such as silicon nitride, may be impermeable to ions, electric charge, and fluids (i.e., the diffusion of all of these species is zero). Any membrane may be used in accordance with the present disclosure, so long as the membrane can include a transmembrane nanoscale opening (e.g., a nanopore well) and can maintain a potential difference across the membrane. The membrane may be a monolayer or a multilayer membrane. A multilayer membrane includes two or more layers, each of which is a non-permeable or semi-permeable material.

The membrane 16, 26 may be formed of materials of biological or non-biological origin. A material that is of biological origin refers to material derived from or isolated from a biological environment, such as an organism or cell, or a synthetically manufactured version of a biologically available structure (e.g., a biomimetic material).

An example membrane that is made from the material of biological origin includes a monolayer formed by a bola-lipid. As shown in FIG. 1A, another example membrane 16 that is made from the material of biological origin, includes a lipid bilayer. Suitable lipid bilayers include, for example, a membrane of a cell, a membrane of an organelle, a liposome, a planar lipid bilayer, and a supported lipid bilayer. A lipid bilayer can be formed, for example, from two opposing layers of phospholipids, which are arranged such that their hydrophobic tail groups face towards each other to form a hydrophobic interior, whereas the hydrophilic head groups of the lipids face outwards towards the aqueous environment on each side of the bilayer. Lipid bilayers also can be formed, for example, by a method in which a lipid monolayer is carried on an aqueous solution/air interface past either side of an aperture that is perpendicular to that interface. The lipid is normally added to the surface of an aqueous electrolyte solution by first dissolving it in an organic solvent and then allowing a drop of the solvent to evaporate on the surface of the aqueous solution on either side of the aperture. Once the organic solvent has at least partially evaporated, the solution/air interfaces on either side of the aperture are physically moved up and down past the aperture until a bilayer is formed. Other suitable methods of bilayer formation include tip-dipping, painting bilayers, and patch-clamping of liposome bilayers. Any other methods for obtaining or generating lipid bilayers may also be used.

A material that is not of biological origin may also be used as the membrane. Some of these materials are solid state materials and can form a solid state membrane 28 as shown in FIG. 1B, and others of these materials, can form a thin liquid film or membrane. The solid state membrane can be a monolayer, such as a coating or film on a supporting substrate (i.e., a solid support), or can be a free-standing element. The solid state membrane can also be a composite of multilayered materials in a sandwich configuration. Any material not of biological origin may be used, as long as the resulting membrane can include a transmembrane nanoscale opening and can maintain a potential difference across the membrane. The membranes may include organic materials, inorganic materials, or both. Examples of suitable solid state materials include, for example, microelectronic materials, insulating materials (e.g., silicon nitride ($Si_3N_4$), aluminum oxide ($Al_2O_3$), hafnium oxide ($HfO_2$), tantalum pentoxide ($Ta_2O_5$), silicon oxide ($SiO_2$), etc.), some organic and inorganic polymers (e.g., polyamide, plastics, such as polytetrafluoroethylene (PTFE), or elastomers, such as two-component addition-cure silicone rubber), and glasses. In addition, the solid state membrane can be made from a monolayer of graphene, which is an atomically thin sheet of carbon atoms densely packed into a two-dimensional honeycomb lattice, a multilayer of graphene, or one or more layers of graphene mixed with one or more layers of other solid state materials. A graphene-containing solid state membrane can include at least one graphene layer that is a graphene nanoribbon or graphene nanogap, which can be used as an electrical sensor to characterize the target polynucleotide. The solid state membrane can be made by any suitable method. As examples, the graphene membrane can be prepared through either chemical vapor deposition (CVD) or exfoliation from graphite. Examples of suitable thin liquid film materials that may be used include diblock copolymers, triblock copolymers, such as amphiphilic PMOXA-PDMS-PMOXA ABA triblock copolymers.

As used herein, the term "nanopore well" is intended to mean a hollow structure discrete from and extending across the membrane that permits ions, electric current, and/or fluids to cross from one side of the membrane to the other side of the membrane. For example, a membrane that inhibits the passage of ions or water soluble molecules can include a nanopore well structure that extends across the membrane to permit the passage (through a nanoscale opening/channel extending through the nanopore well structure) of the ions or water soluble molecules from one side of the membrane to the other side of the membrane. The diameter of the nanoscale opening/channel can vary along its length (i.e., from one side of the membrane to the other side of the membrane), but at any point is on the nanoscale (i.e., from about 1 nm to about 100 nm, or to less than 1000 nm). Examples of the nanopore well include, for example, biological nanopore wells, solid state nanopore wells, and biological and solid state hybrid nanopore wells.

As used herein, the term "diameter" is intended to mean a longest straight line inscribable in a cross-section of a nanoscale opening through a centroid of the cross-section of the nanoscale opening. It is to be understood that the nanoscale opening may or may not have a circular or substantially circular cross-section (the cross-section of the nanoscale opening being substantially parallel with the cis/trans electrodes). Further, the cross-section may be regularly or irregularly shaped.

As used herein, the term "biological nanopore well" is intended to mean a nanopore well whose structure portion is made from materials of biological origin. Biological origin refers to a material derived from or isolated from a biological environment such as an organism or cell, or a synthetically manufactured version of a biologically available structure. Biological nanopore wells include, for example, polypeptide nanopore wells and polynucleotide nanopore wells.

As used herein, the term "polypeptide nanopore well" is intended to mean a protein/polypeptide that extends across the membrane, and permits ions and/or fluids to flow therethrough from one side of the membrane to the other side of the membrane. A polypeptide nanopore well can be a monomer, a homopolymer, or a heteropolymer. Structures of polypeptide nanopore wells include, for example, an α-helix bundle nanopore well and a β-barrel nanopore well. Example polypeptide nanopore wells include α-hemolysin, *Mycobacterium smegmatis* porin A (MspA), aerolysin, gramicidin A, maltoporin, OmpF, OmpC, PhoE, Tsx, F-pilus, etc. The protein α-hemolysin is found naturally in cell membranes, where it acts as a channel for ions or molecules to be transported in and out of cells. *Mycobacterium smegmatis* porin A (MspA) is a membrane porin produced by Mycobacteria, which allows hydrophilic molecules to enter the bacterium, an example of which is depicted in FIG. 1A. MspA forms a tightly interconnected octamer and transmembrane beta-barrel that resembles a goblet and contains a central channel/pore.

A polypeptide nanopore well can be synthetic. A synthetic polypeptide nanopore well includes a protein-like amino acid sequence that does not occur in nature. The protein-like amino acid sequence may include some of the amino acids that are known to exist but do not form the basis of proteins (i.e., non-proteinogenic amino acids). The protein-like amino acid sequence may be artificially synthesized rather than expressed in an organism and then purified/isolated.

As used herein, the term "polynucleotide nanopore well" is intended to include a polynucleotide that extends across the membrane, and permits ions and/or fluids to flow from one side of the membrane to the other side of the membrane. A polynucleotide pore can include, for example, a polynucleotide origami (e.g., nanoscale folding of DNA to create the nanopore well).

Also as used herein, the term "solid state nanopore well" is intended to mean a nanopore well whose structure portion includes materials of non-biological origin (i.e., not of biological origin). A solid-state nanopore well can be formed of an inorganic or organic material. Solid state nanopore wells include, for example, silicon nitride nanopore wells, silicon dioxide ($SiO_2$) nanopore wells, and graphene nanopore wells.

The nanopore wells disclosed herein may be hybrid nanopore wells. A "hybrid nanopore well" refers to a nanopore well including materials of both biological and non-biological origins. An example of a hybrid nanopore well includes a polypeptide-solid state hybrid nanopore well and a polynucleotide-solid state nanopore well.

As used herein, the term "nanopore sensor device," "nanopore well sequencer," "nanopore well sequencing device," or "nanopore sensor" refers to any of the devices disclosed herein that can be used for nanopore well sequencing. In the examples disclosed herein, during nanopore well sequencing, the nanopore well is immersed in example(s) of the electrolyte disclosed herein and a potential difference is applied across the membrane. In an example, the potential difference is an electric potential difference or an electrochemical potential difference. An electrical potential difference can be imposed across the membrane via a voltage source that injects or administers current to at least one of the ions of the electrolyte contained in the cis well or one or more of the trans wells. An electrochemical potential difference can be established by a difference in ionic composition of the cis and trans wells in combination with an electrical potential. The different ionic composition can be, for example, different ions in each well or different concentrations of the same ions in each well.

The application of the potential difference across the nanopore wells may force the translocation of a nucleic acid relative to the nanopore well. One or more signals are generated that correspond to the translocation of the nucleotide relative to the nanopore well. Accordingly, as a target polynucleotide, or as a mononucleotide or a probe derived from the target polynucleotide or mononucleotide, transits through the nanopore well, the current across the membrane changes due to base-dependent (or probe dependent) blockage of the constriction, for example. The signal from that change in current can be measured using any of a variety of methods. Each signal is unique to the species of nucleotide(s) (or probe) in the nanopore well, such that the resultant signal can be used to determine a characteristic of the polynucleotide. For example, the identity of one or more species of nucleotide(s) (or probe) that produces a characteristic signal can be determined.

As used herein, a "nucleotide" includes a nitrogen containing heterocyclic base, a sugar, and one or more phosphate groups. Nucleotides are monomeric units of a nucleic acid sequence. Examples of nucleotides include, for example, ribonucleotides or deoxyribonucleotides. In ribonucleotides (RNA), the sugar is a ribose, and in deoxyribonucleotides (DNA), the sugar is a deoxyribose, i.e., a sugar lacking a hydroxyl group that is present at the 2' position in ribose. The nitrogen containing heterocyclic base can be a purine base or a pyrimidine base. Purine bases include adenine (A) and guanine (G), and modified derivatives or analogs thereof. Pyrimidine bases include cytosine (C), thymine (T), and uracil (U), and modified derivatives or analogs thereof. The C-1 atom of deoxyribose is bonded to N-1 of a pyrimidine or N-9 of a purine. The phosphate groups may be in the mono-, di-, or tri-phosphate form. These nucleotides are natural nucleotides, but it is to be further understood that non-natural nucleotides, modified nucleotides or analogs of the aforementioned nucleotides can also be used.

As used herein, "nucleobase" is a heterocyclic base such as adenine, guanine, cytosine, thymine, uracil, inosine, xanthine, hypoxanthine, or a heterocyclic derivative, analog, or tautomer thereof. A nucleobase can be naturally occurring or synthetic. Examples of nucleobases are adenine, guanine, thymine, cytosine, uracil, xanthine, hypoxanthine, 8-azapurine, purines substituted at the 8 position with methyl or bromine, 9-oxo-N6-methyladenine, 2-aminoadenine, 7-deazaxanthine, 7-deazaguanine, 7-deaza-adenine, N4-ethanocytosine, 2,6-diaminopurine, N6-ethano-2,6-diaminopurine, 5-methylcytosine, 5-(C3-C6)-alkynylcytosine, 5-fluorouracil, 5-bromouracil, thiouracil, pseudoisocytosine, 2-hydroxy-5-methyl-4-triazolopyridine, isocytosine, isoguanine, inosine, 7,8-dimethylalloxazine, 6-dihydrothymine, 5,6-dihydrouracil, 4-methyl-indole, ethenoadenine and the non-naturally occurring nucleobases described in U.S. Pat. Nos. 5,432,272 and 6,150,510 and PCT applications WO 92/002258, WO 93/10820, WO 94/22892, and WO 94/24144, and Fasman ("Practical Handbook of Biochemistry and Molecular Biology", pp. 385-394, 1989, CRC Press, Boca Raton, LO), all herein incorporated by reference in their entireties.

The term "nucleic acid" or "polynucleotide" refers to a deoxyribonucleotide or ribonucleotide polymer in either single- or double-stranded form, and unless otherwise limited, encompasses known analogs of natural nucleotides that hybridize to nucleic acids in manner similar to naturally occurring nucleotides, such as peptide nucleic acids (PNAs) and phosphorothioate DNA. Unless otherwise indicated, a particular nucleic acid sequence includes the complementary sequence thereof. Nucleotides include, but are not limited to, ATP, dATP, CTP, dCTP, GTP, dGTP, UTP, TTP, dUTP, 5-methyl-CTP, 5-methyl-dCTP, ITP, dITP, 2-amino-adenosine-TP, 2-amino-deoxyadenosine-TP, 2-thiothymidine triphosphate, pyrrolo-pyrimidine triphosphate, and 2-thiocytidine, as well as the alphathiotriphosphates for all of the above, and 2'-O-methyl-ribonucleotide triphosphates for all the above bases. Modified bases include, but are not limited to, 5-Br-UTP, 5-Br-dUTP, 5-F-UTP, 5-F-dUTP, 5-propynyl dCTP, and 5-propynyl-dUTP.

For example, a template polynucleotide chain may be any sample that is to be sequenced, and may be composed of DNA, RNA, or analogs thereof (e.g., peptide nucleic acids). The source of the template (or target) polynucleotide chain can be genomic DNA, messenger RNA, or other nucleic acids from native sources. In some cases, the template polynucleotide chain that is derived from such sources can be amplified prior to use. Any of a variety of known amplification techniques can be used including, but not limited to, polymerase chain reaction (PCR), rolling circle amplification (RCA), multiple displacement amplification (MDA), or random primer amplification (RPA). It is to be understood that amplification of the template polynucleotide chain prior to use is optional. As such, the template polynucleotide chain will not be amplified prior to use in some examples. Template/target polynucleotide chains can optionally be derived from synthetic libraries. Synthetic nucleic acids can have native DNA or RNA compositions or can be analogs thereof.

Biological samples from which the template polynucleotide chain can be derived include, for example, those from a mammal, such as a rodent, mouse, rat, rabbit, guinea pig, ungulate, horse, sheep, pig, goat, cow, cat, dog, primate, human or non-human primate; a plant such as *Arabidopsis thaliana*, corn, sorghum, oat, wheat, rice, canola, or soybean; an algae such as *Chlamydomonas reinhardtii*; a nematode such as *Caenorhabditis elegans*; an insect such as *Drosophila melanogaster*, mosquito, fruit fly, honey bee or spider; a fish such as zebrafish; a reptile; an amphibian such as a frog or *Xenopus laevis*; a Dictyostelium discoideum; a fungi such as *Pneumocystis carinii* Takifugu *rubripes*, yeast, *Saccharomyces cerevisiae* or *Schizosaccharomyces pombe*; or a *Plasmodium falciparum*. Template polynucleotide chains can also be derived from prokaryotes such as a bacterium, *Escherichia coli*, staphylococci or *Mycoplasma pneumoniae*; an archae; a virus such as Hepatitis C virus, ebola virus or human immunodeficiency virus; or a viroid. Template polynucleotide chains can be derived from a homogeneous culture or population of the above organisms or alternatively from a collection of several different organisms, for example, in a community or ecosystem.

As used herein, the term "signal" is intended to mean an indicator that represents information. Signals include, for example, an electrical signal and an optical signal. The term "electrical signal" refers to an indicator of an electrical quality that represents information. The indicator can be, for example, current, voltage, tunneling, resistance, potential, conductance, capacitance, frequency, or other changes in an electrical waveform.

The term "substrate" refers to a rigid, solid support 11, 21 that is insoluble in aqueous liquid and is incapable of passing a liquid absent an aperture, port, or other like liquid conduit. In the examples disclosed herein, the substrate may have wells or chambers defined therein. Examples of suitable substrates include glass and modified or functionalized glass, plastics (including acrylics, polystyrene and copolymers of styrene and other materials, polypropylene, polyethylene, polybutylene, polyurethanes, polytetrafluoroethylene (PTFE) (such as TEFLON® from Chemours), cyclic olefins/cyclo-olefin polymers (COP) (such as ZEONOR® from Zeon), polyimides, etc.), nylon, ceramics, silica or silica-based materials, silicon and modified silicon, carbon, metals, inorganic glasses, and optical fiber bundles.

A "stimulus source" refers to an electronic device that is to provide a stimulus that causes ionic current to flow through the nanopore well. In one example, the stimulus source may be a current source or a voltage source coupled to the cis and/or trans electrodes. In another example, the stimulus source may be any source creating an electric field between the cis well and the trans well.

A "nanopore sensor" can refer to a "nanopore well sequencing system."

As used herein, the terms "well", "cavity" and "chamber" are used synonymously, and refer to a discrete feature defined in the device that can contain a fluid (e.g., liquid, gel, gas). A "cis well" is a common chamber that contains or is partially defined by a cis electrode, and is also fluidically connected to each of a plurality of trans wells through a respective nanopore well. Examples of an array of the present device may have one cis well or multiple cis wells. Each "trans well" is a single chamber that contains or is partially defined by its own trans electrode, and is also fluidically connected to one cis well. Each trans well is electrically isolated from each other trans well. In some examples, each trans well is connected to a respective stimulus source, and to a respective amplifier (e.g., Axopatch 200B amplifiers or trans-impedance amplifiers) to amplify electrical signals passing through respective nanopore wells associated with each of the trans wells. In other examples, the trans wells are connected to a single stimulus source which individually addresses the trans wells via multiplexing. Further, it is to be understood that the cross-section of a well taken parallel to a surface of a substrate at least partially defining the well can be curved, square, polygonal, hyperbolic, conical, angular, etc.

The aspects and examples set forth herein and recited in the claims can be understood in view of the above definitions.

Nanopore Sensor

Figure 2:
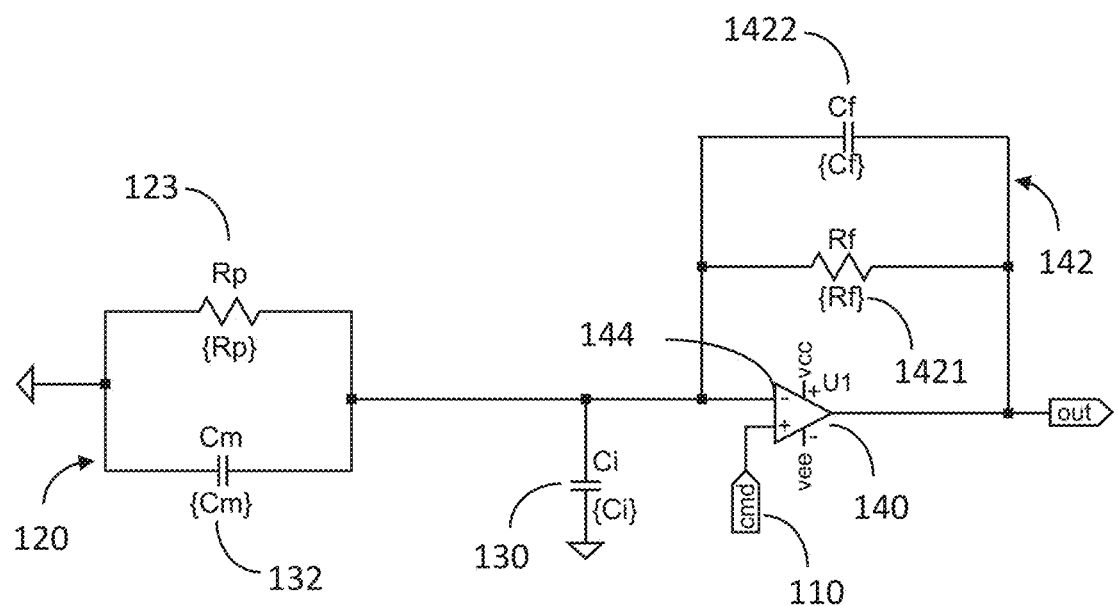
FIG. 2 is an exemplary circuit of a nanopore sensor system.

A typical example of an equivalent circuit of a nanopore sensor system 100 is represented by the circuit schematic as shown in FIG. 2. As shown in FIG. 2, a nanopore well embedded in a membrane can be characterized as an equivalent circuit 120 by implementing a nanopore well resistor 123 and a membrane capacitor 132 in parallel. The amplifier 140 shown in FIG. 2 is a trans-impedance amplifier having a feedback loop 142. As shown in FIG. 2, the capacitor 1422 of the feedback loop 142 in this example represents stray capacitor associated with the feedback resistor 1421. As the nanopore well resistor 123 is in the GΩ range, the amplifier 140 typically has gains in the 1×109 V/A range. Therefore, the feedback resistor 1421 is also in the GΩ range. With the membrane capacitor 132 in the order of a few pF, the time constant of the feedback circuit is, therefore in the order of a few ms.

In FIG. 2, the nanopore well 120 can receive a bias voltage from a non-inverting input terminal (i.e., positive terminal) of the amplifier 140. For example, as shown in FIG. 2, the command node (cmd) 110 is applied at a positive terminal as a non-inverting input voltage of the amplifier 140, where the output node of the amplifier is interconnected with the negative input terminal 144 of the amplifier 140 via a feedback loop 142. In this example, the bias voltage across the nanopore well 120 and the membrane is supplied utilizing a supply voltage at the command node 110, which is transmitted to the nanopore well 120 via the feedback loop 142 of the amplifier 140. However, the nanopore sensor system 100 that is represented by the circuit shown in FIG. 2 has a technical limitation in supplying microsecond-scale pulses to the nanopore well because the amplifier 140 cannot respond to short time duration pulse signal in the order of microseconds (s) at the negative input terminal 144 utilized as a bias voltage source of the nanopore well. This limitation is due to a limited bandwidth of the feedback loop 142 of the amplifier 140, and the limitation can cause pulse signal distortion, such as the pulse shape, magnitude, and duration. A capacitor 130 can be implemented between the negative terminal and ground. To overcome this drawback, various embodiments of systems and methods are disclosed that allow the application of s-scale pulses to a nanopore well that improves the efficiency and accuracy of sequencing reads.

Figure 3:
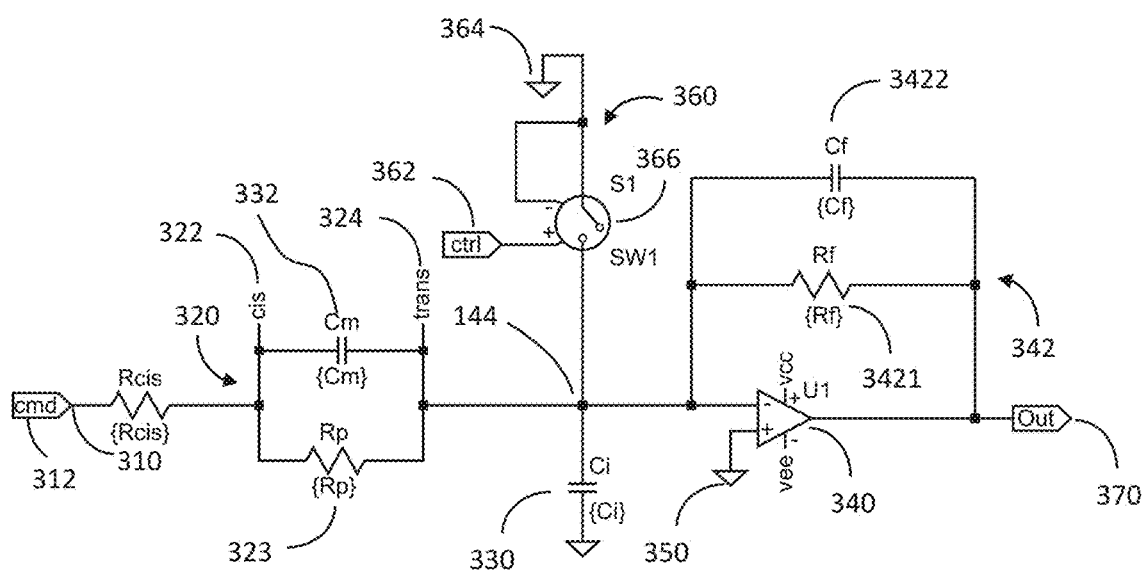
FIG. 3 illustrates an exemplary circuit of a nanopore sensor system according to some embodiments.

FIG. 3 illustrates an equivalent circuit of a nanopore sensor system 300 according to some embodiments. In these embodiments, the nanopore sensor system 300 includes a nanopore system 320. As shown in FIG. 3, the nanopore sensor 320 can be characterized as an equivalent circuit by implementing a cis well associated with a cis electrode 322 and a trans well associated with a trans electrode 324, a membrane 332 (characterized as a capacitor, Cm, in FIG. 3) separating the cis well and the trans well, and the nanopore well resistor 323 connected with the membrane in parallel. The nanopore sensor 320 can be constructed to provide a channel through the membrane, examples of which are partially shown in FIGS. 1A and 1B. In some embodiments, a command voltage signal 312 can be applied as a bias voltage (between the cis electrode 322 and the trans electrode 324) of the nanopore sensor 320 via the command node 310, where the command voltage signal 312 is applied directly to the nanopore sensor 320. The system ground 350 can be provided by the non-inverting input of the amplifier 340 as shown. The amplifier 340 shown in FIG. 3 is illustrated with a single operational amplifier (OP amp) as an example, and the present disclosure is not limited thereto, and the amplifier 340 can include more than one OP amp based on a specific application as well as different topologies, for example a capacitively coupled current integrator.

Further, in FIG. 3, the nanopore sensor system 300 can include a command voltage signal 312 applied at the command node 310 to supply a bias voltage to the cis 322 of the nanopore sensor 320. In some embodiments, the command voltage signal 312 can be a short time duration pulse voltage signal. In these embodiments, the command voltage signal 312 can be generated by utilizing a voltage generator, and the voltage generator can be integrated in the nanopore sensor system 300 or an external circuitry or device. In one embodiment, the voltage generator can be a clock signal generator. In some embodiments, the command voltage signal 312 is a short time duration pulse signal with microseconds or nanoseconds pulse duration. Thus, the nanopore well system 320 can receive a bias voltage with a short time duration pulse signal without utilizing the feedback loop 342. In some embodiments, the feedback loop 342 connects the negative input terminal of the amplifier 340 and output 370 of the amplifier 340. The microseconds pulse duration is merely an example, and voltage signals with various pulse durations can be applied based on a specific application.

In some embodiments, the nanopore sensor system 300 can further include one or more amplifiers 340. In some embodiments, the amplifiers 340 include one or more feedback loops 342. The feedback loop 342 can be characterized by implementing a feedback resistor 3421 and a feedback capacitor 3422, and the value of the feedback resistor 3421 and capacitor 3422 can be specified based on the trans-impedance specification such as a gain, noise, offset voltage, etc.

In some embodiments, the nanopore sensor system 300 can include a switch 366. In these embodiments, the switch 366 can be utilized to minimize a signal distortion within the bias voltage signal (i.e., bias voltage of the nanopore sensor 320), where the bias voltage signal can be a pulse wave signal including a leading edge, trailing, and a falling edge. For example, the bias voltage signal at the falling edge can be distorted because of the capacitance in the membrane 332 and an input capacitance, Ci, 330. In this example, when a command voltage signal 312 (a pulse signal) is applied, the membrane 332 and the input capacitance 330 are charged and discharged based on the pulse signal. The charging and discharging of the membrane 332 and the input capacitance 330 may require charging or discharging time periods. These time periods can cause signal distortion at the falling edge of the bias voltage signal. For example, when the command voltage signal 312 is changed from high to low (i.e., from 1 to 0), the membrane 332 and the input capacitance 330 may require the discharging time period to change their state from high to low, which means that the discharging time period causes a signal distortion at the falling edge of the bias voltage due to the time delay in response to the command voltage signal 312 change. In some embodiments, the switch can be closed (or turned on) at the time or before or after each of the falling edge of the bias voltage signal by a fixed offset to prevent any signal distortion caused by any capacitance generated in the amplifier 340 from affecting the integrity of the voltage drop across the nanopore well resistor 323. In some embodiments, the time, before or after each of the falling edge of the bias voltage signal can be referred to as offset time. The offset time can be predefined. The predefined offset times can be determined based on specific applications. For example, at the time of the falling edge or before or after the falling edge (during the trailing) for each pulse of the bias voltage signal, the switch 366 can be closed, so the amplifier's inverting input is connected ground while the switch 366 is closed. The switch 366 can be turned off before a next pulse of the bias voltage signal. The turning on or off of the switch 366 can be repeated while operating the nanopore sensor system 300. In some embodiments, the switch 366 is implemented as a component of a switching circuitry 360. In these embodiments, the switching circuitry 360 includes the switch 366 and a switch controller 362. The switch 366 can be controlled based on the switch controller 362. For example, the switch controller 362 can generate a control signal, such as a clock scheme signal to control the switch 366. The control signal can be customizable by utilizing any signal generator, such as a clock scheme generator, and the control signal can be determined based on a specific application. Furthermore, a positive terminal of the switch is connected to the switch controller 362, and a negative terminal of the switch 366 can be connected to a ground 364. In some embodiments, the command voltage signal 312 can be utilized as the switch controller 362. The present disclosure is not limited to a specific type of switch, and the switch can be any type of switch such as MEMS, metal oxide semiconductor field effect transistor (MOSFET), switching circuitry, optical switch, etc. In some embodiments, the switch is closed before or simultaneously with the leading edge of the command pulse. In some embodiments, the switch is opened after or simultaneously with the trailing edge of the command pulse In some embodiments, the nanopore sensor 320, the amplifier 340, and the switching circuitry 360 are coupled at the negative input terminal 144 (inverting input terminal). For example, the trans electrode 324 of the nanopore sensor 320, a positive terminal of the switch 366, and the feedback loop 342 are connected at the negative input terminal 144 of the amplifier 340.

Figure 4:
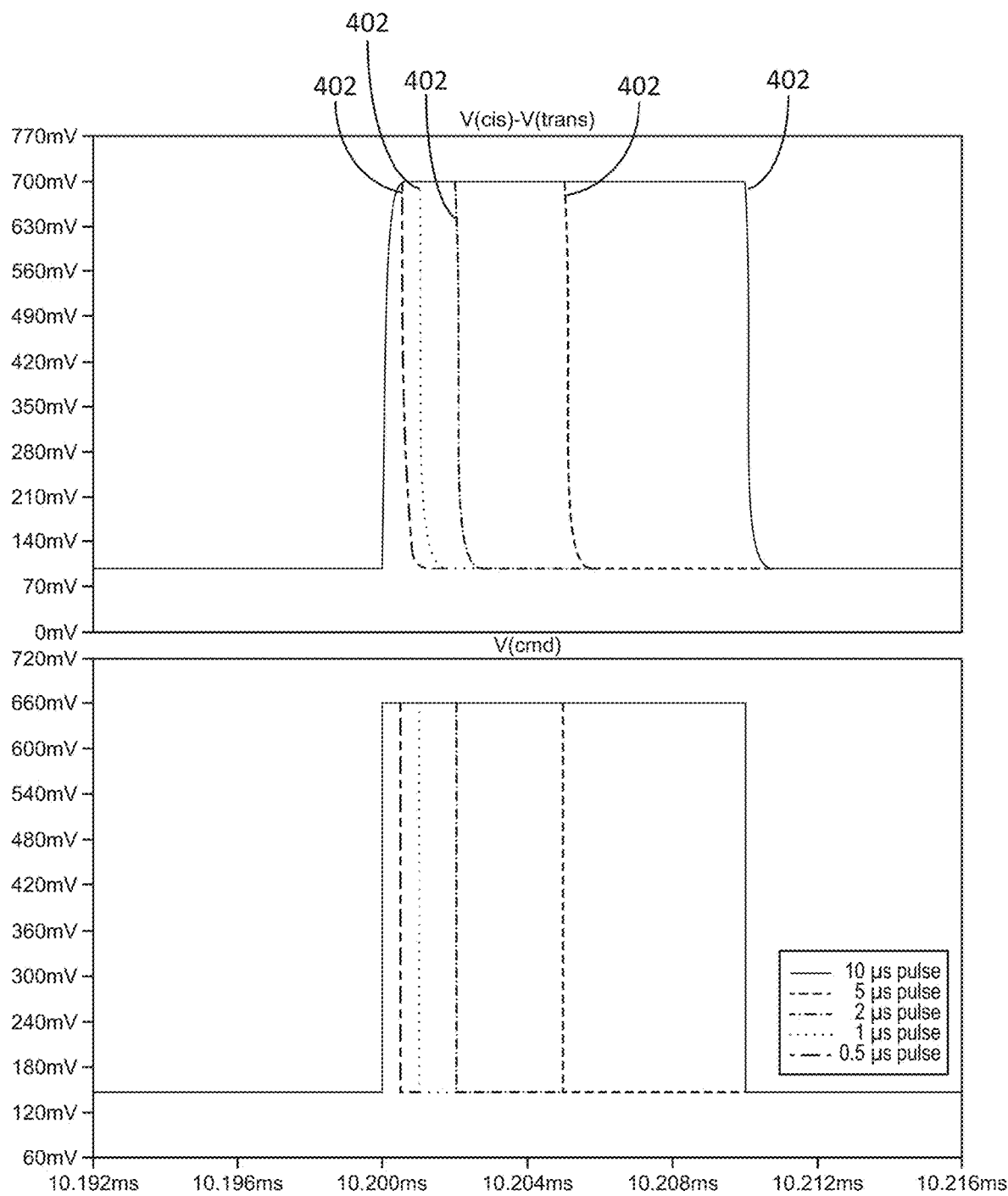
FIG. 4 shows a simulated response from the nanopore sensor system of FIG. 3.

FIG. 4 shows an example of stimulated response from the nanopore sensor system 300 shown in FIG. 3. For the purpose of convenience, FIG. 4 is described by referencing FIG. 3. To minimize distortion at the falling edge 402 of each pulse of the bias signal between the cis electrode 322 and the trans electrode 324, the switch 366 may be opened shortly before the arrival of the command pulse and closed shortly after the trailing edge completes (i.e., trailing edge is a pulse signal between a leading edge and a falling edge of the pulse). As shown in FIG. 4, a clock pulse from the switch controller 362 closes the switch 366 at 100 s before the arrival of the command pulse, and the clock pulse re-opens the switch 366 at 100 s after its completion. The result from timing the activity of the switch 366 is the maintenance of the integrity of the pulse down to 500 ns. Accordingly, in some embodiments, the clock pulse from the switch controller 362 is applied at a predetermined time prior to the command pulse from the command node 310 being applied. In some embodiments, the switch is closed before or simultaneously with the leading edge of the command pulse. In some embodiments, the switch is opened after or simultaneously with the trailing edge of the command pulse.

Figure 5:
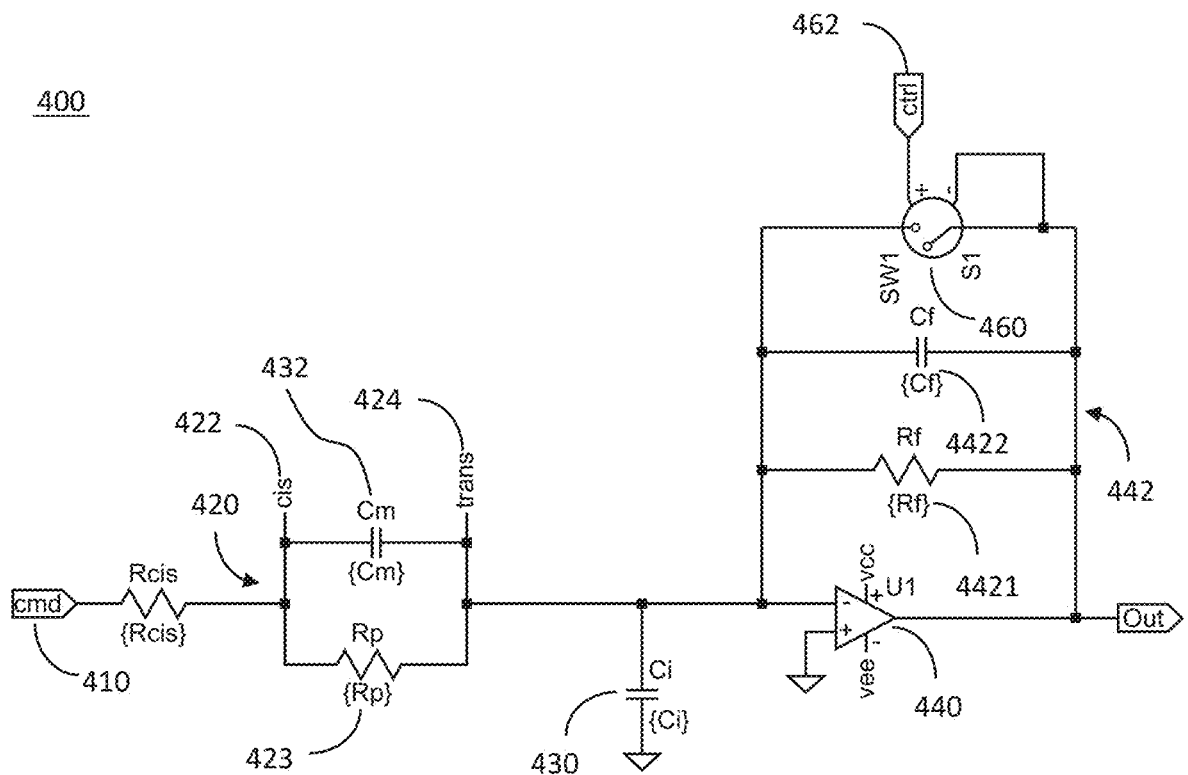
FIG. 5 illustrates another exemplary circuit of a sequencing system according to some embodiments.

FIG. 5 illustrates an equivalent circuit of a nanopore well sequencing system 400 according to some embodiments. The nanopore well sequencing system 400 can include a nanopore sensor 420 that includes a cis well associated with a cis electrode 422 and a trans well associated with a trans electrode 424. In some embodiments, the cis well 15, the cis electrode 12, the trans well 17, and the trans electrode 14 are substantially similar to those illustrated in FIG. 1A. In some embodiments, the cis well 25, the cis electrode 22, the trans well 27, and the trans electrode 24 are substantially similar to those illustrated in FIG. 1B. In some embodiments, the sequencing system 400 further includes a membrane 432 (represented in the circuit of FIG. 9 as membrane capacitance), separating the cis well and the trans well. In some embodiments, the membrane 432 is substantially similar to the membrane 16 illustrated in FIG. 1A. In some embodiments, the membrane 432 is substantially similar to the membrane 26 illustrated in FIG. 1B. In some embodiments, the sequencing system 400 further includes a nanopore sensor 420 embedded in the membrane 432 that provides a channel through the membrane 432. In some embodiments, the sequencing system 400 further includes a command node 410 connected directly to the nanopore sensor 420, wherein the command node 410 is configured to apply a potential across the nanopore sensor 423 and a command pulse from the command node 410; and an amplifier 440 with a feedback loop 442 coupled to the nanopore sensor 420, which is similar to at least one of the embodiments disclosed above. In some embodiments, the nanopore sensor 420 is about 5 µm wide. In some embodiments, the membrane 432 is a solid-state membrane, a polymeric membrane, or a lipid membrane.

Further at FIG. 5, in some embodiments, the system 400 further include a switch 460 disposed across the feedback loop 442 of the amplifier 440. In these embodiments, the feedback loop 442 is characterized by connecting an output terminal of the amplifier 440 with the negative terminal (inverting input terminal) of the amplifier 440. As shown in FIG. 5, the feedback loop 442 can include components such as a resistor 4421, a capacitor 4422, and the switch 460 that these components are connected in parallel. In some embodiments, the switch 460 is driven by a clock pulse 462, and the switch 460 is configured to bypass an inverting loop of the amplifier 440 when the switch 460 is closed. In these embodiments, the clock pulse 462 can be customizable by utilizing any signal generator, such as a clock scheme generator, and the clock pulse 462 can be determined based on a specific application. In one embodiment, the input signal at the command node 410 can be utilized as the switch controller 362. The present disclosure is not limited to a specific type of switch, and the switch can be any type of switch such as MEMS, metal oxide semiconductor field effect transistor (MOSFET), switching circuitry, optical switch, etc.

Further at FIG. 5, in some embodiments, the switch 460 is configured to be closed when a threshold of the clock pulse 462 is exceeded. In some embodiments, the switch 460 is configured to be opened when the amplitude of the clock pulse 462 from the control node drops below the threshold. In some embodiments, the clock pulse is applied at a predetermined time prior to the command pulse being applied. In some embodiments, the clock pulse has a trailing edge that trails a trailing edge of the command pulse by a second predetermined time.

Figure 6:
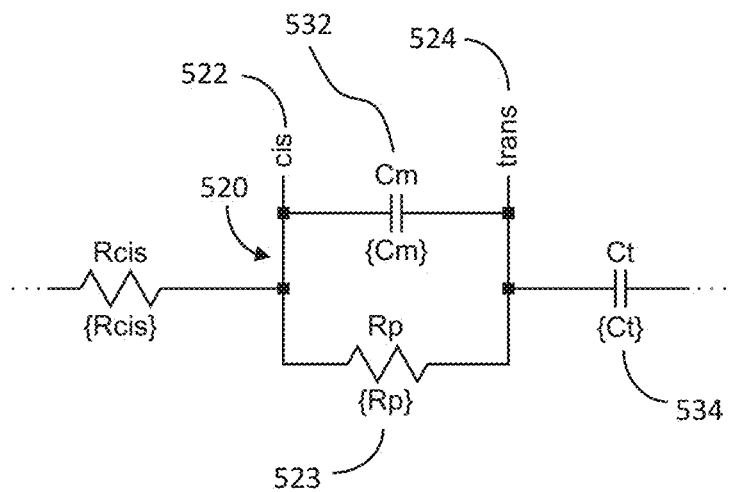
FIG. 6 illustrates an exemplary circuit of a nanopore sensor.

With the switch 460 disposed across the feedback look 442 of the amplifier 440, the system 400 may be further configured to rely on sensing transient currents or voltages in the absence of Faradaic effects where the Debye layer capacitance on the trans electrode 424 introduces an impediment to the DC current flow as shown in FIG. 6. In FIG. 6, the nanopore well sequencing system 400 may be modified such that faradaic reactions at the cis and trans electrodes 522, 524 of the nanopore sensor 520 represented in the circuit diagram of FIG. 6 are absent. In other words, the nanopore sensor 520 of FIG. 6 exhibits non-faradaic reactions at the cis and trans electrodes 522, 524 such that the behavior of the electrode-solution interface is analogous to that of a capacitor 534 as explained below.

Embodiments Using Complementary Metal Oxide Semiconductor (CMOS) Amplifier

In some embodiments, various types of the amplifier can be implemented into the nanopore sensor to minimize a bias voltage signal distortion. For example, the amplifiers 340 and 440, as shown in FIGS. 3 and 5, respectively, can be a complementary metal oxide semiconductor (CMOS) amplifier. In one embodiment, reducing the size of the nano well can also minimize the bias voltage signal distortion.

Figure 7:
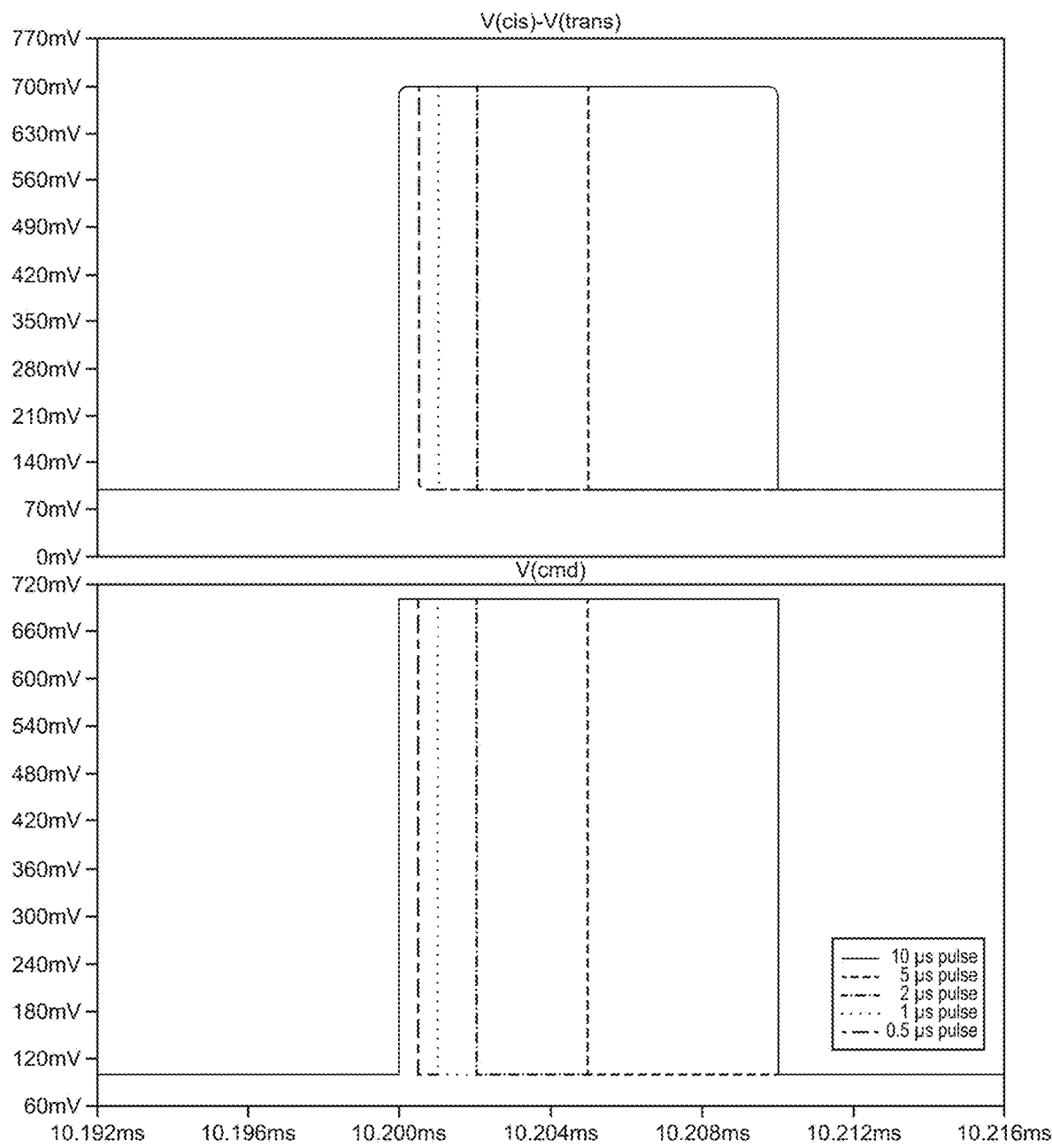
FIG. 7 shows a simulated response from an exemplary nanopore well sequencing system.
Figure 8:
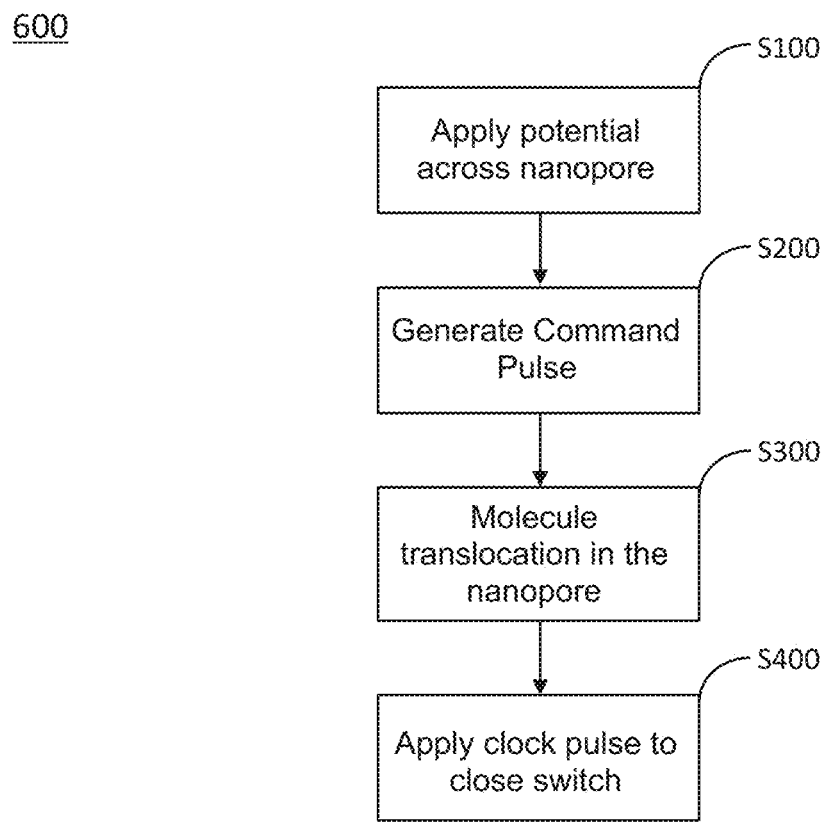
FIG. 8 illustrates a method of a nanopore sensor sequencing according to some embodiments.

FIG. 7 shows a simulated response from the nanopore sensor system 300 (shown in FIG. 3) by implementing a CMOS amplifier 340. For the purpose of convenience, FIG. 6 is described by referencing FIG. 3. In some embodiments, the distortion at the falling edge of each pulse can be minimized by: a) reducing the physical size of the nanopore sensor 320, and 2) use of integrated CMOS amplifiers that reside close to the nanopore sensor 320 to reduce stray capacitances. For example, a 5 μm nanopore sensor 320 is expected to have a membrane 332 and input capacitance 330 of ~100 fF, and the stray capacitance of the feedback capacitor 3422 associated with this nanopore well resistor 323 will be reduced to a similar value (a stimulated response with these parameters is shown in FIG. 8). As shown in FIG. 8, the integrity of the command pulse from the command node 310 is maintained down to 100 ns. Accordingly, in some embodiments, the nanopore sensor 320 is about 5 μm in diameter. In some embodiments, the nanopore 320 has a diameter from about 1 μm to about 200 μm, such as from 5 μm to about 100 μm. In some embodiments, the membrane 332 is a solid-state membrane, a polymeric membrane, a lipid membrane.

In another embodiment, a method 600 of using the nanopore sensor system 300 is provided as shown in FIG. 8. At block S100, the method 600 includes applying a potential across a nanopore sensor 320 via a command node 310 connected directly to the nanopore sensor 320, wherein the nanopore well is configured to receive a polynucleotide. In some embodiments of the method 600, the nanopore well is configured to receive a polypeptide. In some embodiments of the method 600, the nanopore well is configured to receive a label/tab. In some embodiments of the method 600, the label/tab is incorporated with a nucleotide. In some embodiments of the method 600, at block S200, the method 600 further includes generating a command pulse at the command node 310. In some embodiments, at block S300, the step of generating the command pulse translocates one unit of the polynucleotide through the nanopore well. In some embodiments, the step of generating the command pulse (at block S200) translocates (at block S300) one unit of the polypeptide through the nanopore well. In some embodiments of the method 600, at block S200, the step of generating the command pulse translocates, at block S300, one unit of the label/tab of the incorporated nucleotide through the nanopore well.

In some embodiments of the method 600, the method further includes, at block S400, applying a clock pulse from the switch controller 362 to close a switching circuitry 360 disposed between the nanopore sensor 320 and an amplifier 340 to ground an inverting input of the amplifier 340 during the translocation (at block S300) of the polynucleotide. In some embodiments of the method 600, similar clock pulse parameters are employed as disclosed in the above embodiments. In some embodiments of the method 600, the clock pulse is the same as the command pulse. In some embodiments of the method 600, the clock pulse is applied before the command pulse. In some embodiments of the method 600, the switching circuitry 360 is closed about 100 μs before the application of the command pulse. In some embodiments of the method 600, after the clock pulse has a trailing edge that trails the trailing edge of the command pulse. In some embodiments of the method 600, the switching circuitry 360 is opened about 100 μs after the end of the trailing edge of the command pulse. In some embodiments of the method 600, the command pulse has a duration of from about 0.1 μs to about 50 μs. In some embodiments of the method 600, the command pulse duration is from about 0.5 μs to about 50 μs. In some embodiments, the command pulse has a duration of from about 0.1 μs to about 1,000 μs, such as 0.5 μs to about 500 μs.

Figure 9A:
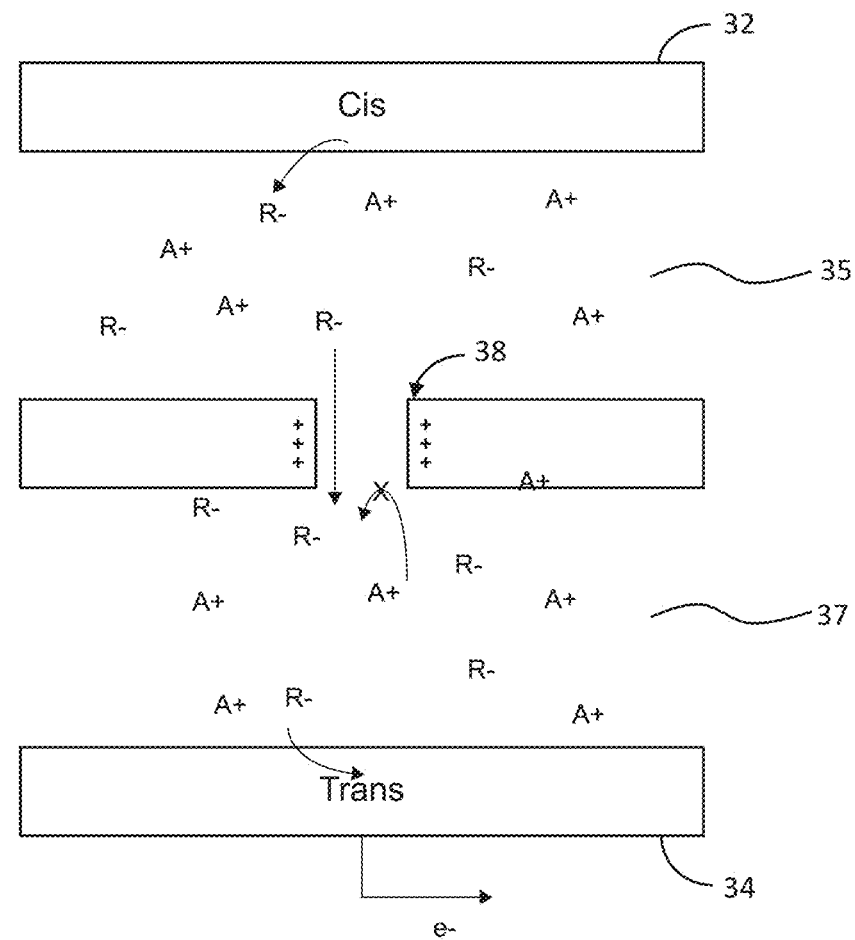
FIG. 9A is a schematical view of another exemplary nanopore sensor.

Most nanopore sensor systems 300 or 400 can utilize faradaic Ag/AgCl cis and trans electrodes 32, 34 in which the electrolyte is predominantly KCl only, where the Cl⁻ anion is the redox-active component R⁻. To sustain a current passing from the cis electrode 32 to the trans electrode 34, electrochemical reactions are required at both electrodes. In the case of Ag/AgCl electrodes, the reaction at the trans well 37 is shown in FIG. 9A in which charges (e.g., electrons) are transferred across the metal-solution interface. The electron transfer causes a redox reaction, which is indicative of the redox active nature of the electrolyte buffer. Therefore, the electrodes actively participate in the reaction. In some embodiments, as shown in FIG. 9A, only R⁻ passes through nanopore well 38, which induces a positive charge in the nanopore well as well as having only R⁻ consumed at the trans electrode. In some embodiments the polarity of the nanopore well 38 is inverted, wherein the redox reagent is positively charged, which induces a negative charge in the nanopore well 38.

Figure 9B:
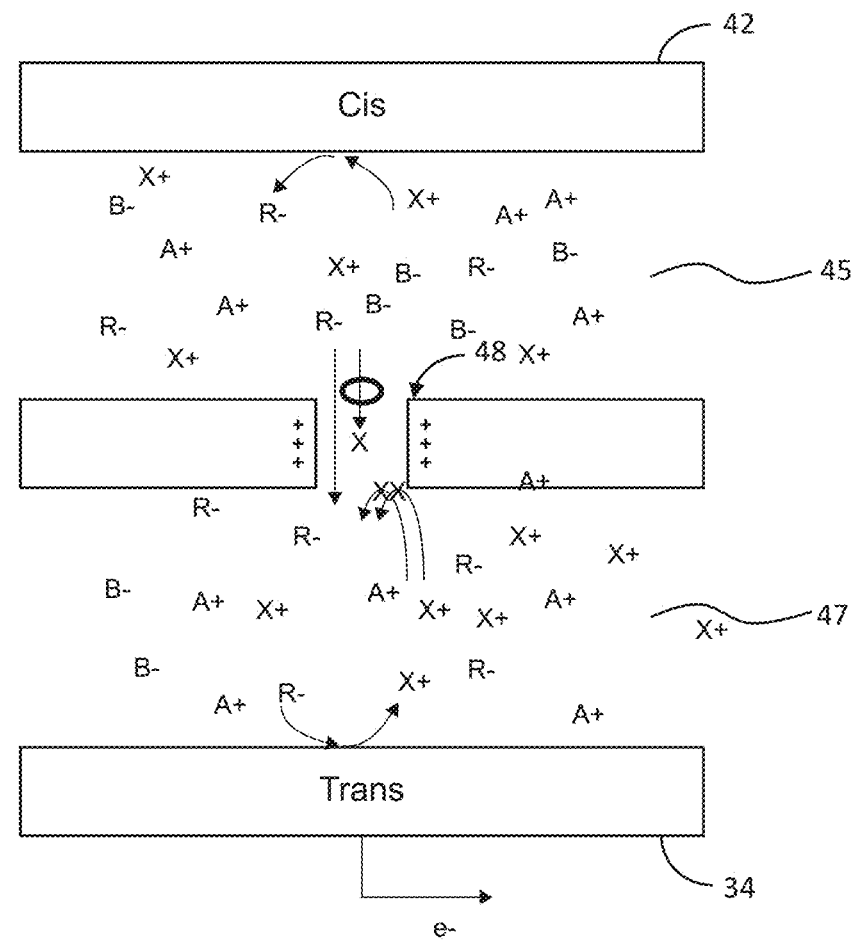
FIG. 9B is a schematical view of another exemplary nanopore sensor.

For non-faradaic cis and trans electrodes 42, 44 illustrated in FIG. 9B, these electrodes require the use of a redox mediator in solution to carry sufficient current at the respective electrodes. Metals that can be used for non-faradaic electrodes include (but are not limited to) Au, Pt, and Ru. An example of a redox mediator used in nanopore well sequencing is the ferri/ferrocyanide redox couple: $Fe(CN)_6^{-3/-4}$. As shown in FIG. 9B, a redox mediator $X^+/R^-$ redox couple is in an $A^+/B^-$ redox-inactive buffer. In some embodiments, $Fe(CN)_6^{-3/-4}$ is the redox couple in a KCl buffer. Accordingly, the redox couple is suspended in a redox-inactive buffer, which renders the electrodes as passive. In some embodiments, only the redox couple is absorbed by the trans electrode 44. In some embodiments, the trans electrode 44 may include intercalation material that absorbs the redox couple. In some embodiments, the trans electrode 44 may include a redox-active ferrocene group immobilized on a surface of the trans electrode 44. Because both B⁻ and R⁻ pass through the nanopore well and only R⁻ is consumed at the trans electrode 44, there is an imperfect balance between supply and demand, which requires the minimization of the buffer concentration. In some embodiments, B⁻ is too bulky to pass through the pore. In some embodiments, the polarity is inverted, which means that the redox active component R⁺ is positively charged and a negative charge is induced in the nanopore well 48. While charges do not cross the metal-solution interface for non-faradaic electrodes, external currents can flow (at least transiently) when the potential or solution composition changes, which means that the current is dependent on 1) the surface area of the electrodes, and 2) concentrations of the redox mediator and the redox-inactive buffer. In other words, in non-faradaic processes, the metal-solution interface (here, the metal including the trans electrode 44 shown in FIG. 9B) behaves like the capacitor 534 shown in FIG. 6.

The scope of the present disclosure is not intended to be limited by the specific disclosures of preferred examples in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Additional Embodiments

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range, as if such value or sub-range were explicitly recited. For example, a range from about 2 nm to about 20 nm should be interpreted to include not only the explicitly recited limits of from about 2 nm to about 20 nm, but also to include individual values, such as about 3.5 nm, about 8 nm, about 18.2 nm, etc., and sub-ranges, such as from about 5 nm to about 10 nm, etc. Furthermore, when "about" and/or "substantially" are/is utilized to describe a value, this is meant to encompass minor variations (up to +/−10%) from the stated value.

While several examples have been described in detail, it is to be understood that the disclosed examples may be modified. Therefore, the foregoing description is to be considered non-limiting.

While certain examples have been described, these examples have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, or example are to be understood to be applicable to any other aspect or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing examples. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some examples, the actual steps taken in the processes illustrated and/or disclosed may differ from those shown in the figures. Depending on the example, certain of the steps described above may be removed or others may be added. Furthermore, the features and attributes of the specific examples disclosed above may be combined in different ways to form additional examples, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular example. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without user input or prompting, whether these features, elements, and/or steps are included or are to be performed in any particular example.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

Language of degree used herein, such as the terms "approximately," "about," "generally," and "substantially" represent a value, amount, or characteristic close to the stated value, amount, or characteristic that still performs a desired function or achieves a desired result.

The scope of the present disclosure is not intended to be limited by the specific disclosures of preferred examples in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A sequencing system, comprising:
a nanopore sensor comprising a cis well associated with a cis electrode and a trans well associated with a trans electrode, a membrane separating the cis well and the trans well, and a nanopore well embedded in the membrane providing a channel through the membrane;
a node connected directly to the nanopore sensor, wherein the node is configured to apply a potential across the nanopore well and a first voltage pulse;
an amplifier coupled to the nanopore sensor; and
a switch disposed between the amplifier and the nanopore sensor, wherein the switch is configured to be driven by a clock pulse and to ground an inverting input of the amplifier.

2. The system of claim 1, wherein the switch is configured to close when a threshold of the clock pulse is exceeded.

3. The system of claim 2, wherein the switch is configured to open when an amplitude of the clock pulse drops below the threshold.

4. The system of claim 1, wherein the clock pulse is the same as the first voltage pulse.

5. The system of claim 1, wherein the clock pulse is applied at a predetermined offset relative to the first voltage pulse being applied.

6. The system of claim 5, wherein the clock pulse has a trailing edge that is offset from the trailing edge of the first voltage pulse by a second predetermined time.

7. The system of claim 1, wherein the nanopore sensor is about 1 μm-about 200 μm wide.

8. The system of claim 1, wherein the membrane is a solid-state membrane, a polymeric membrane, or a lipid membrane.

9. The system of claim 1, further comprising an electrolyte in solution in the cis and trans wells, wherein the electrolyte acts as a redox reagent.

10. The system of claim 9, wherein the redox reagent is negatively charged,
wherein the nanopore well is configured to allow the redox reagent to pass through, and
wherein the trans electrode is configured to consume the redox reagent.

11. The system of claim 9, wherein the electrolyte comprises KCl, and wherein the redox reagent comprises Cl⁻ from the electrolyte.

12. The system of claim 9, wherein the redox reagent is positively charged,
wherein the redox reagent passes through the nanopore well, and
wherein the redox reagent is consumed at the trans electrode.

13. The system of claim 9, wherein the trans electrode acts as a capacitor.

14. The system of claim 9, further comprising a redox-inactive buffer.

15. The system of claim 14, wherein the redox-inactive buffer comprises $Fe(CN)_6^{-3/-4}$.

16. The system of claim 14, wherein the redox reagent is negatively charged.

17. The system of claim 14, wherein the redox reagent is positively charged.

18. A method of using a sequencing system of claim 1 comprising:
applying a potential across said nanopore well of said sequencing system via said node connected directly to the nanopore sensor, wherein the nanopore well is configured to receive a polynucleotide;
generating a first voltage pulse to translocate one unit of the polynucleotide in the nanopore well; and
applying a clock pulse to close said switch disposed between the nanopore well and said amplifier to ground an inverting input of the amplifier during the translocation of the polynucleotide.

19. The method of claim 18, wherein the clock pulse is the same as the first voltage pulse.

20. The method of claim 18, wherein the clock pulse is applied with an offset relative to the first voltage pulse.

21. The method of claim 20, wherein the offset is about 0.5 μs to about 500 μs.

22. The method of claim 20, wherein the offset is from a trailing edge of the clock pulse to a trailing edge of the first voltage pulse.

23. The method of claim 22, wherein the offset is about 0.5 μs to about 500 μs.

24. The method of claim 18, wherein the nanopore sensor is about 1 μm-200 μm wide.

25. The method of claim 18, wherein the first voltage pulse has a duration of from about 0.1 μs to about 500 μs.

26. The method of claim 25, wherein the first voltage pulse duration is from about 0.5 μs to about 500 μs.

27. A sequencing system, comprising:
a nanopore sensor comprising a cis well associated with a cis electrode and a trans well associated with a trans electrode, a membrane separating the cis well and the trans well, and a nanopore well embedded in the membrane providing a channel through the membrane;
a node connected directly to the nanopore sensor, wherein the node is configured to apply a potential across the nanopore well and a first voltage pulse;
an amplifier with a feedback loop coupled to the nanopore sensor;
a switch disposed across the feedback loop, wherein the switch is configured to be driven by a clock pulse and to bypass an inverting loop when the switch is closed.

28. The system of claim 27, wherein the switch is configured to close when a threshold of the clock pulse is exceeded.

29. The system of claim 28, wherein the switch is configured to open when an amplitude of the clock pulse drops below the threshold.

30. The system of claim 27, wherein the clock pulse is same as the first voltage pulse.

31. The system of claim 27, wherein the clock pulse is applied at a predetermined time prior to the first voltage pulse being applied.

32. The system of claim 31, wherein the clock pulse has a trailing edge that trails a trailing edge of the first voltage pulse by a second predetermined time.

33. The system of claim 27, wherein the nanopore sensor is about 1 μm-about 200 μm wide.

34. The system of claim 27, wherein the membrane is a solid-state membrane, a polymeric membrane, or a lipid membrane.

\* \* \* \* \*